United States Patent
Lin

(10) Patent No.: US 8,224,309 B2
(45) Date of Patent: Jul. 17, 2012

(54) METHOD FOR PRESENTING TARGET INFORMATION DURING CALL CONNECTION SEQUENCE

(76) Inventor: Yu-Chieh Lin, Taipei (TW)

(*) Notice: Subject to any disclaimer, the term of this patent is extended or adjusted under 35 U.S.C. 154(b) by 207 days.

(21) Appl. No.: 12/832,368

(22) Filed: Jul. 8, 2010

(65) Prior Publication Data

US 2011/0009108 A1    Jan. 13, 2011

(30) Foreign Application Priority Data

Jul. 10, 2009  (TW) ............................... 98123325 A

(51) Int. Cl.
*H04M 3/00* (2006.01)
(52) U.S. Cl. ............... 455/418; 455/414.1; 455/422.1; 379/265.02
(58) Field of Classification Search .......... 455/418, 455/414.1, 422.1; 379/265.02
See application file for complete search history.

(56) References Cited

U.S. PATENT DOCUMENTS

| | | | | |
|---|---|---|---|---|
| 6,643,370 | B1* | 11/2003 | Kurihara et al. | 379/355.02 |
| 6,879,685 | B1* | 4/2005 | Peterson et al. | 379/265.11 |
| 6,980,835 | B2* | 12/2005 | Hama | 455/567 |
| 2007/0127679 | A1* | 6/2007 | Matsuhashi et al. | 379/218.01 |
| 2007/0291931 | A1* | 12/2007 | DeMent | 379/418 |
| 2010/0303220 | A1* | 12/2010 | Brooks et al. | 379/142.05 |

* cited by examiner

*Primary Examiner* — Danh Le
(74) *Attorney, Agent, or Firm* — WPAT., P.C.; Justin King

(57) ABSTRACT

An information presenting method is provided for presenting target information by a first communication device during a call connection sequence. Firstly, target information is pre-downloaded to and stored in first communication device. When a call request issued by the user to the second communication device is detected by the first communication device, the target information is automatically presented. When a connection completing signal issued from the second communication device is detected by the first communication device, the information segment that is being presented is completely presented, and then the presentation of the target information is stopped. As such, normal communication between the user through the first communication device and the receiver through the second communication device is permitted.

20 Claims, 7 Drawing Sheets

METHOD FOR PRESENTING TARGET INFORMATION DURING CALL CONNECTION SEQUENCE

FIELD OF THE INVENTION

The present invention relates to a method for presenting information such as advertisement or other multimedia information, and more particularly to a method for presenting target information during a call connection sequence.

BACKGROUND OF THE INVENTION

Due to the portability and a large number of users, it is believed or anticipated that mobile phones will become the "Fifth Media" after newspapers, radio or TVs. For example, mobile phones are good advertising media or information providing carriers.

For example, the applications of mobile phones as advertising media or information providing carriers have been disclosed in for example Taiwanese Patent Publication Nos. TW200744010, TW200818856, TW200843394, TW200845639, and US Patent Publication Nos. US20090281849, US20080059285, US20080059300, US20090265214, US20100125492.

Conventionally, there are several applications of providing advertisement or multimedia information in the mobile network. Firstly, SMS (Short Message Service), MMS (Multimedia Message Service), Wireless Access Protocol (WAP) push operation and Webpage-clicking operation are common ways for offering advertisement and other information. As such, most users of the mobile phones usually feel annoyed at the on-line advertisement and fail to escape from the bothersome advertisement. In addition, the process of processing the uninvited spam advertisement is time-consuming. Even if the user is willing to watch or listen to some of the advertisement, the mobile phone needs to link to a network system or a specified software needs to be executed. Secondly, since time is so valuable in modern societies, most people make fully use of fragmental time intervals for learning, watching or listening to some useful information. If the user wants to watch or listen to the information during the call connection sequence, the user needs to press a specified key of the mobile phone to active the information presenting function. The conventional information presenting method is not satisfied because the time of the call connection sequence is not very long and is uncontrollable by the user.

On the other hand, according to current technologies of advertising or publishing information by the mobile phone through SMS (Short Message Service), MMS (Multimedia Message Service), the advertisement or information is passively presented for only one time when the advertisement or information is received by the user. In addition, most users seldom actively and repeatedly click the connecting information shown on the web page. For allowing the user to watch or listen to the information for many times, the messages should be repeatedly transmitted or the web page should become more attractive to passively induce the user to click the information (or advertisement). Due to the repeat data flow of the information, the conventional information presenting method wastes resources.

SUMMARY OF THE INVENTION

For obviating the drawbacks encountered from the prior art, the present invention provides a method for presenting the complete content of an information segment of target information during a call connection sequence without the need of doing any action on the mobile phone by the user.

In accordance with an aspect of the present invention, there is provided an information presenting method for presenting target information by a first communication device during a call connection sequence. The first communication device has a memory. The call connection sequence is a time interval after a user issues a call request to a second communication device of a receiver through the first communication device and before a connection completing signal issued from the second communication device is received by the first communication device. The information presenting method includes the following steps. Firstly, target information including plural information segments is pre-downloaded to the first communication device, and stored in the memory of the first communication device. The plural information segments include a main information segment having a complete content and plural minor information segments following the main information segment. When the call request issued by the user to the second communication device is detected by the first communication device, the target information is automatically presented, and the first communication device continuously monitors whether the connection completing signal issued from the second communication device is received by the first communication device. When the connection completing signal issued from the second communication device is detected by the first communication device, the information segment that is being presented is completely presented, and then the presentation of the target information is stopped. As such, normal communication between the user through the first communication device and the receiver through the second communication device is permitted.

In an embodiment, the call connection sequence contains a first time segment for waiting a mobile network to process a call request, a second time segment after an incoming call is generated in the second communication device and before the receiver accepts and answers the incoming call, and a third time segment after the receiver accepts and answers the incoming call to generate the connection completing signal and before the user responds to the connection completing signal.

In an embodiment, the target information is presented during the call connection sequence by software, wherein the software is independent software, instant message software, browser software or a subroutine function module of any other information-providing application software.

In an embodiment, the procedure of presenting the target information during the call connection sequence is implemented by a hardware-type function module of the first communication device.

In an embodiment, in the step (2), when the call request issued by the user to the second communication device is detected by the first communication device, the main information segment is immediately and completely presented, wherein after the main information segment has been completely presented, if no connection completing signal is issued from the second communication device, the plural minor information segments are successively presented.

In an embodiment, the duration of completely presenting the main information segment is longer than the duration of completely presenting each of the minor information segments.

In an embodiment, the first communication device is further in communication with a network system, wherein in the step (1), the target information is downloaded to the first communication device through the network system when the first communication device is in an idle time or a scheduled time.

In an embodiment, in the step (1), the target information is downloaded to the first communication device through the network system according to following sub-steps: (11) accessing an information management platform system through the network system by inputting user identity information through a user accessing module of the first communication device; (12) identifying the user identity information by a user information managing module of the information management platform system, wherein if the user identity information is valid, the first communication device is permitted to upload user-related information to the information management platform system so as to further transmit, analyze and process associated data; (13) receiving the user-related information by a user behavior analyzing and managing module of the information management platform system, and analyzing the user-related information to determine whether a file-update operation needs to be performed on the first communication device or not, wherein if the file-update operation is performed on the first communication device, at least one data-filtering parameter is created; (14) selecting and determining at least one specified file suitable for the user according to the at least one data-filtering parameter by an information file managing and downloading module of the information management platform system, and transmitting at least one file-selecting signal corresponding to the at least one specified file to an information database module of the information management platform system; (15) sending the at least one specified file from the information database module back to the information file managing and downloading module of the information management platform system according to the file-selecting signal; (16) transmitting the at least one specified file from the information file managing and downloading module to the first communication device; and (17) receiving the at least one specified file by the first communication device, and performing a file managing and updating operation on the data stored in the memory by an information file managing and updating module.

In an embodiment, in the sub-step (11), the user identity information includes a user account and a password associated with access of information-providing application software, or the user identity information includes a user account and a password specialized for downloading the target information.

In an embodiment, in the sub-step (11), the first communication device is in communication with the network system according to a telecommunication's wireless transmission technology, a computer's wireless transmission technology or a computer's wired transmission technology.

In an embodiment, the first communication device further includes a call request detecting module, a connection completing signal detecting module and an intelligent information presenting module. In the steps (2) and (3), the target information is presented by the first communication device according to following sub-steps: (21) detecting the call request issued from the first communication device by the call request detecting module; (22) transmitting a presentation-starting signal from the call request detecting module to the intelligent information presenting module; (23) starting to present the main information segment of the target information by the intelligent information presenting module regardless of how the call request is processed by the network system, wherein during the main information segment is presented, the connection completing signal detecting module continuously detects a connection or disconnection status of the connection completing signal from the second communication device, thereby realizing whether the receiver responds to the call request; (24) successively presenting the plural minor information segments of the target information if the second communication device has not communicated with the first communication device; (25) a presentation-stopping signal is immediately issued from the connection completing signal detecting module to the intelligent information presenting module if the connection completing signal from the second communication device is detected; and (26) completely presenting the main information segment or the minor information segment that is being presented and then stopping presenting the target information when the presentation-stopping signal is received by the intelligent information presenting module.

In an embodiment, the first communication device further includes a user behavior and device environmental information collecting module for collecting the user-related information.

In an embodiment, the user-related information includes user behavior information and device environmental information, and the user behavior information is acquired from the information file managing and updating module by the user behavior and device environmental information collecting module.

In an embodiment, the target information includes a video content, a sound content, an image content, an animation content, a text content, or the combination thereof.

In an embodiment, the first communication device is a mobile communication device with the ability to connect to a network system and having a display screen, or a mobile phone, or a fixed telephone, or a computer.

In accordance with another aspect of the present invention, there is provided an information presenting method for presenting target information by a first communication device during a call connection sequence. The first communication device having a memory. The call connection sequence is a time interval after a user issues a call request to a second communication device of a receiver through the first communication device and before a connection completing signal issued from the second communication device is received by the first communication device. The information presenting method includes steps of: (1) pre-downloading target information to the first communication device and storing the target information in the memory of the first communication device; (2) automatically presenting the target information when the call request issued by the user to the second communication device is detected by the first communication device, and continuously monitoring whether the connection completing signal issued from the second communication device is received by the first communication device; and (3) completely presenting the information segment that is being presented when the connection completing signal issued from the second communication device is detected by the first communication device, and then stopping presenting the target information, so that normal communication between the user through the first communication device and the receiver through the second communication device is permitted.

In an embodiment, the call connection sequence contains a first time segment for waiting a mobile network to process a call request, a second time segment after an incoming call is generated in the second communication device and before the receiver accepts and answers the incoming call, and a third time segment after the receiver accepts and answers the incoming call to generate the connection completing signal and before the user responds to the connection completing signal.

In an embodiment, in the step (1), the pre-downloaded target information includes plural information segment. The plural information segments include a main information segment having a complete content and plural minor information segments following the main information segment.

In accordance with a further aspect of the present invention, there is provided an information presenting method for presenting target information by a first communication device during a call connection sequence. The first communication device has a memory. The call connection sequence is a time interval after a user issues a call request to a second communication device of a receiver through the first communication device and before a connection completing signal issued from the second communication device is received by the first communication device. The information presenting method includes steps of: (1) pre-downloading target information including plural information segments to the first communication device and storing the target information in the memory of the first communication device, wherein the plural information segments include a main information segment having a complete content and plural minor information segments following the main information segment; (2) automatically presenting the target information when the call request issued by the user to the second communication device is detected by the first communication device, and continuously monitoring whether the connection completing signal issued from the second communication device is received by the first communication device; and (3) stopping presenting the information segment when the connection completing signal issued from the second communication device is detected by the first communication device, so that normal communication between the user through the first communication device and the receiver through the second communication device is permitted.

In an embodiment, in the step (3), when the connection completing signal issued from the second communication device is detected by the first communication device, the main information segment or the minor information segment that is being presented is completely presented, and then normal communication between the user through the first communication device and the receiver through the second communication device is permitted.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments and drawings.

The present invention provides an information presenting method for presenting target information during a call connection sequence. The call connection sequence is a time interval after a user issues a call request to a second communication device of a receiver through a first communication device and before a connection completing signal issued from the second communication device is received by the first communication device. The target information to be presented by the first communication device includes for example advertisement, news, and learning about a new word every day, or the like. Generally, the call connection sequence contains three time segments: a first time segment for waiting a mobile network to process a call request, a second time segment after an incoming call is generated in the second communication device and before the receiver accepts and answers the incoming call, and a third time segment after the receiver accepts and answers the incoming call to generate a connection completing signal and before the user responds to the connection completing signal.

Figure 1:
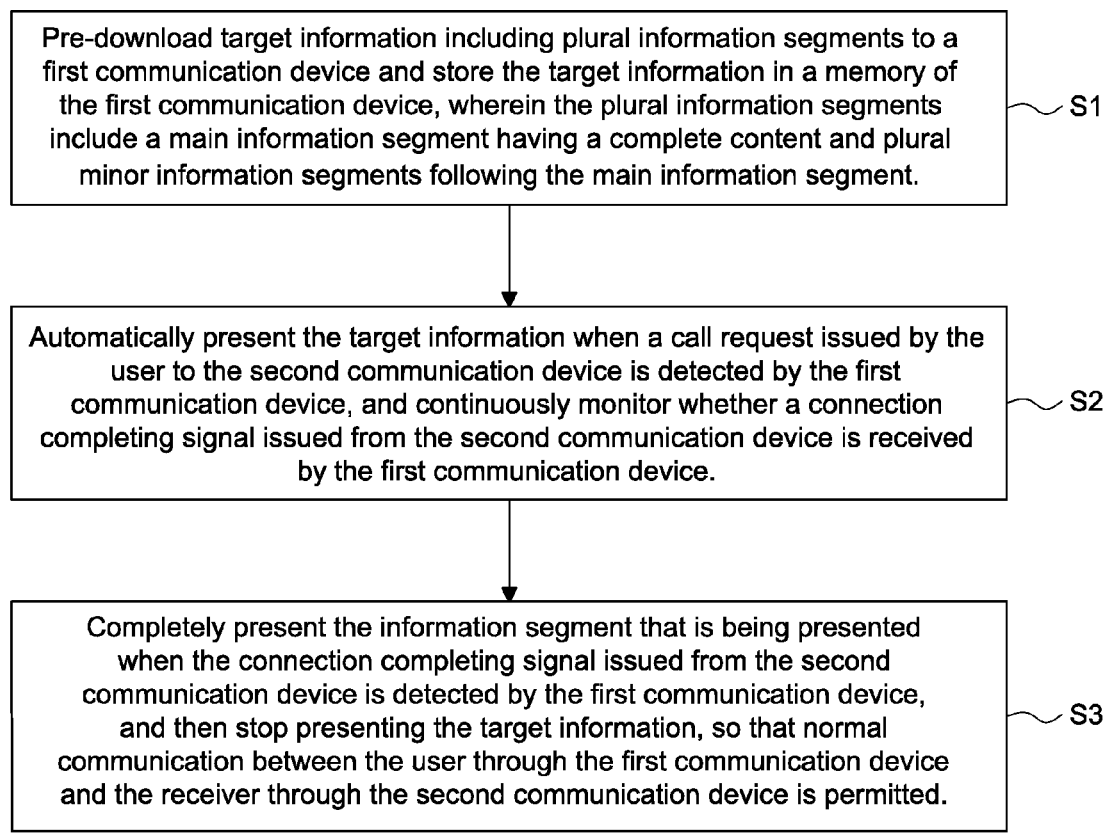
FIG. 1 is a flowchart illustrating an information presenting method according to a first embodiment of the present invention.

The first communication device has a memory. FIG. 1 is a flowchart illustrating an information presenting method according to a first embodiment of the present invention. Hereinafter, the information presenting method will be illustrated with reference to FIG. 1.

In the step S1, target information including plural information segments is pre-downloaded to a first communication device and stored in the memory of the first communication device, wherein the plural information segments include a main information segment having a complete content and plural minor information segments following the main information segment.

The first communication device is in communication with a network system. The target information is pre-downloaded to the first communication device through the network system when the first communication device is in an idle time or a scheduled time. In addition, the target information may be downloaded to the first communication device in an off-line manner. Preferably, the first communication device is in communication with the network system according to a telecommunication's wireless transmission technology (e.g. GPRS or CDMA), a computer's wireless transmission technology (e.g. WiFi, Wireless LAN, Bluetooth or RF), a computer's wired transmission technology (e.g. WLAN, RS-232 or WireFire), or any other wireless transmission technology.

In the step S2, when a call request issued from the user to a second communication device is detected by the first communication device, the target information is automatically presented by the first communication device, and the first communication device continuously monitors whether a connection completing signal issued from the second communication device is received. If the call request issued from the user to the second communication device is detected by the first communication device, the main information segment is immediately and completely presented. After the main information segment has been completely presented, if no connection completing signal is issued from the second communication device, the plural minor information segments are successively presented.

In a case that the first communication device is a mobile phone or a fixed telephone, the call request is issued from the user to the second communication device when the user dials the phone number of the second communication device. Whereas, in a case that an instant message software is running in the first communication device, the call request is issued from the user to the second communication device when a call item, a video call item or a call-out item to contact the second communication device is selected.

In the step S3, when the connection completing signal issued from the second communication device is detected by the first communication device, the information segment that is being presented is completely presented, and then the presentation of the target information is stopped, so that normal communication between the user through the first communication device and the receiver through the second communication device is permitted. Meanwhile, the user of the first communication device can communicate with the receiver of the second communication device.

The method of presenting the target information during the call connection sequence can be executed by independent software, instant message software (e.g. Skype, MSN, QQ or Yahoo Messenger), browser software, or a subroutine function module of any other information-providing application software (e.g. e-paper software, weather report software or e-book software). Alternatively, the method of presenting the information during the call connection sequence can be executed by a hardware-type function module of the first communication device. Of course, the above software is cited for purpose of illustration and description only. The implementation of the information presenting method of the present invention is not limited to the above software.

The target information may includes any type of multimedia contents, such as video contents, sound contents, image contents, animation contents, text contents, or the combination thereof. In some embodiments, the first communication device and the second communication device are mobile communication devices that are able to connect to the network system and have respective display screens. Examples of the mobile communication devices include but are not limited to mobile phones or personal digital assistants (PDA). Alternatively, the first communication device and the second communication device are fixed telephones or computers. The first communication device is in communication with the network system according to a telecommunication's wireless transmission technology (e.g. GPRS or CDMA), a computer's wireless transmission technology (e.g. WiFi, Wireless LAN, Bluetooth or RF), a computer's wired transmission technology (e.g. WLAN, RS-232 or WireFire), or any other wireless transmission technology.

Figure 3:
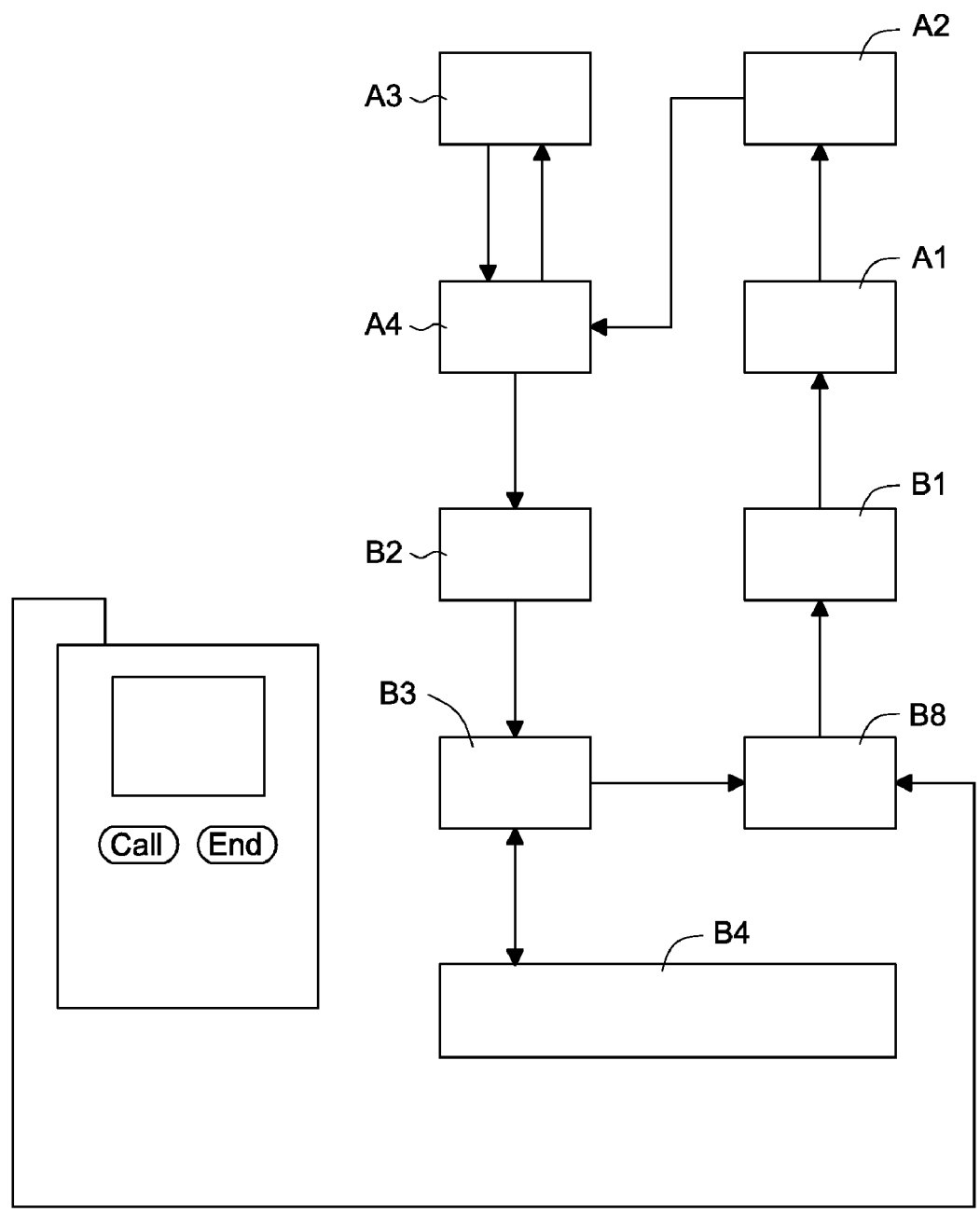
FIG. 3 is a schematic functional block diagram illustrating the relation between an information management platform system and the first communication device.
Figure 5:
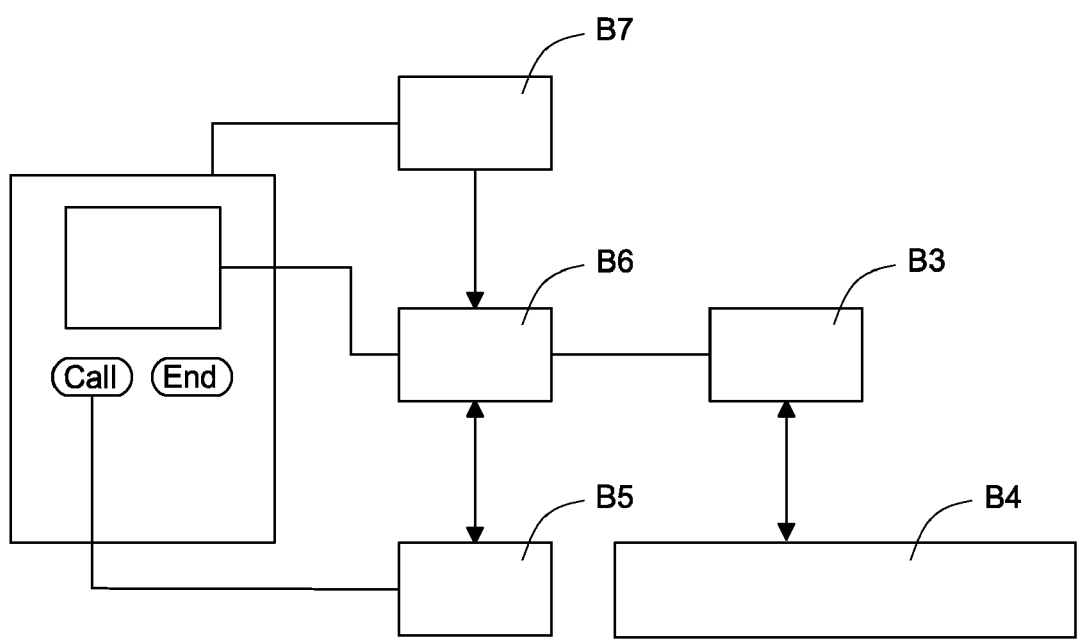
FIG. 5 is a schematic functional block diagram illustrating the relation between respective modules of the first communication device when the information is presented by the first communication device.

The information presenting method of the present invention is implemented by means of several technical modules that are installed in an information management platform system and the first communication device. Please refer to FIGS. 3 and 5. A user information managing module A1, a user behavior analyzing and managing module A2, an information file managing and downloading module A3 and an information database module A4 are included in the information management platform system. A user accessing module B1, an information file downloading module B2, an information file managing and updating module B3, an information file data storage module B4, a call request detecting module B5, an intelligent information presenting module B6, a connection completing signal detecting module B7 and a user behavior and device environmental information collecting module B8 are included in the first communication device.

Figure 2:
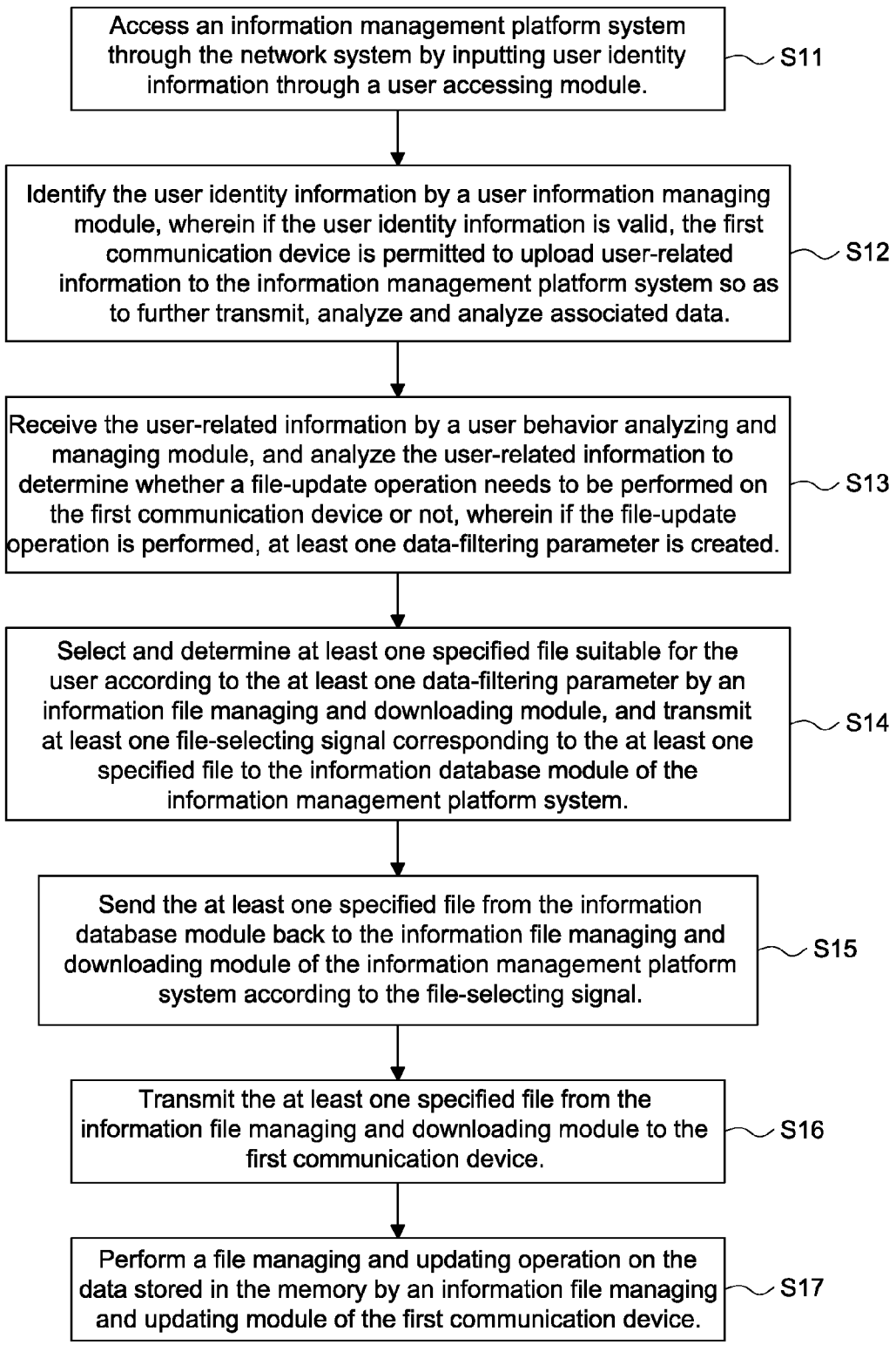
FIG. 2 is a flowchart illustrating a procedure of downloading the target information from the network system to the first communication device in the information presenting method according to the first embodiment of the present invention.

FIG. 2 is a flowchart illustrating a procedure of downloading the target information from the network system to the first communication device in the information presenting method according to the first embodiment of the present invention. The procedure of downloading the target information in the step S1 may include several sub-steps S11~S17, which will be illustrated with reference to FIGS. 2 and 3.

In the step S11, by inputting user identity information through the user accessing module B1 of the first communication device, the user may access the information management platform system through the network system. For example, the user identity information includes a user account and a password associated with the access of the information-providing application software (e.g. the instant message software Skype, MSN, QQ or Yahoo Messenger, the browser software, the e-paper software, the weather report software the or e-book software). Alternatively, the user identity information includes a user account (e.g. a phone number of the user) and a password specialized for downloading the target information. Wherever the user is, the user may input the user account and the password into any other communication device (e.g. mobile phone, computer or PDA) to access the information management platform system. As a consequence, the utilization flexibility of the information presenting method is widened.

In the step S12, if the user identity information identified by the user information managing module A1 of the information management platform system is valid, the first communication device is permitted to upload user-related information to the information management platform system in order to further transmit, analyze and process associated data.

In the step S13, after the user accesses the information management platform system, the user behavior analyzing and managing module A2 will receive the user-related information that is collected by the user behavior and device environmental information collecting module B8. By analyzing the user-related information, the user behavior analyzing and managing module A2 will determine whether a file-update operation is performed on the first communication device or not. If the file-update operation is done, at least one data-filtering parameter is created. According to the at least one data-filtering parameter, the type and content of the target information complying with the user's preference or the type and content of the target information expected to be received by the user will be realized.

The user-related information includes user behavior information and device environmental information. The user-related information may be collected by the user behavior and device environmental information collecting module B8 through the information file managing and updating module B3. For example, the user-related information include one or more items as follows: (a) the time distribution and number of times of making phone calls every day or every week for allowing the information management platform system to select proper type of file data at different time slots; (b) the behavior data associated with the user for watching or listening to advertisement or file data (e.g. some types of data files frequently skipped, or requirement for more information by clicking a specified key) such that the type and content of the information complying with the user's preference will be realized by the information management platform system; (c) the number of times of the presented files exceeding the number of times that is predetermined by the user or the information management platform system; and according to the user-related information, the information management platform system will judge whether a file managing and updating operation is performed on the information file data storage module B4. The file managing and updating operation includes the process of deleting the existing files, overwriting the existing files, updating the existing files, and adding a new file.

The device environmental information or any other useful information may also be collected by the user behavior and device environmental information collecting module B8 through another functional interface of the first communication device. The device environmental information or any other useful information includes for example the coverage of the base station and the time that the user communicates with the base station every day, the time distribution and number of times of the frequently-clicked web pages recently, the specification (e.g. the specifications of the display screen) or functions of the first communication device, or the like.

In the step S14, the information file managing and downloading module A3 of the information management platform system selects and determines at least one specified file suitable for the user according to the at least one data-filtering parameter, and transmits at least one file-selecting signal corresponding to the at least one specified file to the information database module A4 of the information management platform system. The target information may includes any type of multimedia contents, such as video contents, sound contents, image contents, animation contents, text contents, or the combination thereof.

In the step S15, according to the file-selecting signal, the at least one specified file is sent back from the information database module A4 to the information file managing and downloading module A3 of the information management platform system.

In the step S16, the at least one specified file is transmitted from the information file managing and downloading module A3 to the first communication device, and received by the information file downloading module B2 of the first communication device.

After the at least one specified file is received by the information file downloading module B2 in the step S16, the step S17 is performed. In the step S17, according to an information managing condition that is set by the system or the user, the information file managing and updating module B3 performs a file managing and updating operation on the information file data storage module B4. The file managing and updating operation includes the process of deleting the existing files, overwriting the existing files, updating the existing files, and adding a new file. The information managing condition includes but is not limited to one or more of the following item: (a) the preset target number of times of presenting the information file; (b) the scheduled presentation time of some information files (e.g. 06:00~10:00 in the morning, 11:00~13:00 at noon, 13:00~18:00 in the afternoon, 18:00~23:00 in the night, or any other scheduled date or time); (c) the preset date or time for updating the information file; (d) the information type designated by the user (e.g. e-paper, weather report, learning about a new word every day, file, meeting time, subject, content, previous communication record information with the receiver, specified blog information, specified multimedia file).

In the above embodiment, the frequency of updating the target information (e.g. advertisement) is controlled by the system program, and is not determined by the user's settings. For example, in a case that the advertisement publisher wants the advertisement to be presented for at least X times, according to the settings of the system program, the first communication device does not link to the network system to update the information file until the user has viewed the advertisement for X times.

In the above embodiment, the main information segment and each of the plural minor information segments may contain identical or different messages. For example, the main information segment may contain the desired information content for the user, but the minor information segment may contain emphasis or sale advertisement, which is provided by a sponsor or an advertisement publisher or a provider of the main information segment. Of course, the contents of the main information segment and the plural minor information segments are presented herein for purpose of illustration and description only. It is not intended to be exhaustive or to be limited to the precise form disclosed.

The contents of the main information segment and the plural minor information segments may have various data structures. For example, the information content of each information segment may be firstly packed into a packet and then formed as a data stream. Alternatively, the information content may be firstly saved as a complete file comprising many paragraphs. The contents of the main information segment and the plural minor information segments include the distinction indexes of respective paragraphs and the messages about the data lengths of respective paragraphs. Of course, the data structure of the information content is presented herein for purpose of illustration and description only. It is not intended to be exhaustive or to be limited to the precise form disclosed.

Figure 4:
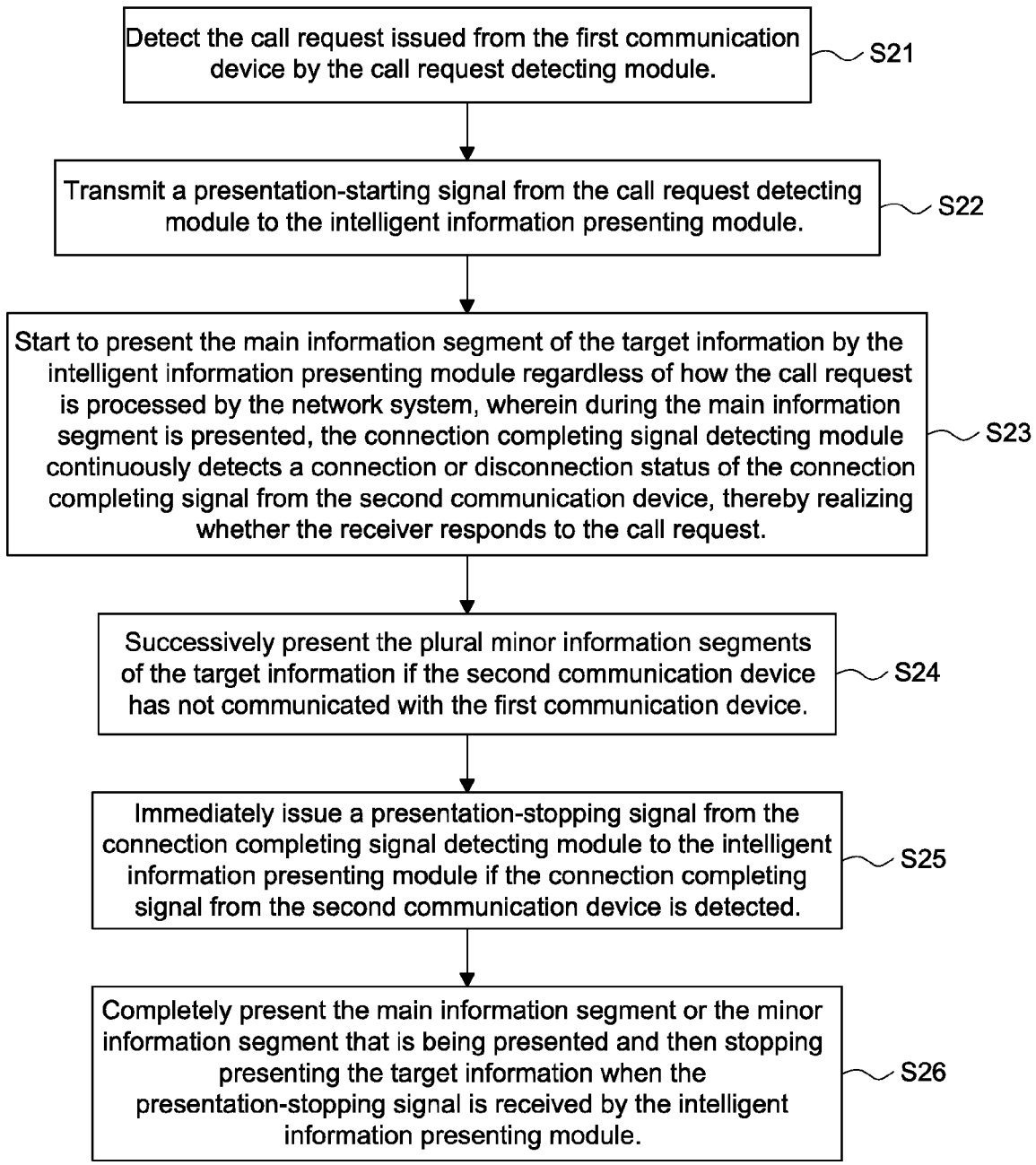
FIG. 4 is a flowchart illustrating a procedure of presenting the information by the first communication device according to the first embodiment of the present invention.

FIG. 4 is a flowchart illustrating a procedure of presenting the information by the first communication device according to the first embodiment of the present invention. The procedure of presenting the information in the steps S2 and S3 may include several sub-steps S21~S26, which will be illustrated with reference to FIGS. 4 and 5.

In the step S21, a call request for communicating with the second communication device is issued from the first communication device and detected by the call request detecting module B5.

In the step S22, a presentation-starting signal is transmitted from the call request detecting module B5 to the intelligent information presenting module B6. Moreover, the file to be presented is set by the system according to an information managing condition. The file to be presented has been previously acquired from the information file managing and updating module B3 by the intelligent information presenting module B6. As a consequence, the information can be immediately presented when the user starts to dial.

In the step S23, regardless of how the call request is processed by the network system, the intelligent information presenting module B6 starts to present the main information segment of the target information. In addition, the main information segment needs to be completely presented. During the main information segment is presented, the connection completing signal detecting module B7 continuously detects the connection/disconnection status of the connection completing signal from the second communication device, thereby realizing whether the receiver responds to the call request.

In the step S24, if the second communication device has not communicated with the first communication device, the plural minor information segments are successively presented by the first communication device. For example, the duration of presenting the main information segment is 3~5 seconds; and the duration of presenting each the minor information segment is 0.5~1.5 seconds. Moreover, the durations of presenting the main information segment and the minor information segments may be longer or shorter, and can be set through the information management platform system.

In the step S25, if the connection completing signal from the second communication device is detected, the connection completing signal detecting module B7 immediately issues a presentation-stopping signal to the intelligent information presenting module B6.

In the step S26, when the presentation-stopping signal is received by the intelligent information presenting module B6, the intelligent information presenting module B6 completely presents the main information segment or the minor information segment that is being presented and then stops presenting the target information.

After the step S26 is finished, the first communication device is in the normal connection status. Meanwhile, the user of the first communication device can communicate with the receiver of the second communication device.

In the first embodiment, the target information may be interactively presented by the user. For example, the information segment that is being presented may be paused, skipped or replayed according to the user's requirements. Moreover, if necessary, the user may inquire additional information or service in order to enhance the efficacy of interacting information.

From the above description, the information presenting method according to the first embodiment of the present invention has the following benefits.

Firstly, in the time interval (e.g. 5 to 20 seconds or longer) after the user issues the call request and before the connection completing signal issued from the receiver is received by the first communication device, the target information that is suitable to the user and stored in the first communication device can be immediately presented by a built-in player (or software or hardware functional modules) of the first communication device. In addition, by monitoring the connection completing signal issued from the second communication device, the information segment to be presented will be determined. As a consequence, the call connection sequence will be properly utilized. Moreover, when the target information is presented, the first communication device does not need to link to the network system and the user does not need to do any action on the first communication device.

Secondly, since the information segments have respective complete contents, the player will adaptively adjust the information segments according to the timing of detecting the connection completing signal, and the information segment that is being presented will be completely presented. In this situation, the user can receive the complete content of the presented information segment of the target information. Even if the receiver accepts and answers the incoming call, the presentation of the target information is not stopped, so that the user can still receive the complete information content.

Thirdly, since the target information is presented during the call connection sequence and previously selected through the system, the user can forecast the occurring time and possible content of the target information. In this situation, the user is no longer bothered by the unexpected information or advertisement.

Fourthly, since the target information is pre-downloaded to the memory of the first communication device, the target information can be immediately presented without any action or waiting time to communicate with the mobile network or the wireless internet. As a consequence, the time during the call connection sequence can be fully utilized.

Fifthly, the usual practice of the user or other user-related information (e.g. the time distribution and the number of times of making phone calls by the user, the coverage of the base station and the time of communicating with the base station, the time distribution and the number of times of the frequently-clicked web pages, the specification or functions of the first communication device, the condition of presenting the file data of the first communication device) can be automatically recorded by software. By analyzing the usual practice of the user or the user-related information, the behavior features and the localized activity features of the user and the user preference on the advertisement or information can be realized. Since the advertisement or information to be presented is automatically selected to meet the user's requirement, the information presenting method of the present invention can be customized and precisely controlled. In other words, the target information complying with specified scope or purpose can be presented during the call connection sequence without the need of specially providing the information by the user or presetting the information by the user.

Sixthly, the content of the target information can be downloaded, updated and stored in the memory of the first communication device during the idle time of the first communication device. As such, without any action on the first communication device, the user can watch or listen to the updated information immediately after the user dials.

Seventhly, in a case that the first communication device is a mobile communication device (e.g. a mobile phone or a PDA), the mobile communication device may generate obvious electromagnetic radiation during the call connection sequence for processing the wireless phone signal. According to the present invention, by presenting the visualized content of the target information, the user may view the display screen of the first communication device at a proper distance during the call connection sequence. Since there is a sufficient safety distance between the first communication device and the head of the user, the adverse effect of the electromagnetic radiation of the first communication device on the user will be minimized.

As discussed in the first embodiment, since the complete information content can be presented by the first communication device during the call connection sequence, the user of the first communication device can watch or listen to the complete content of the presented information segment of the target information. Even if the receiver of the second communication device accepts and answers the incoming call, the presentation of the target information is not stopped, so that the user can still watch or listen to the complete information content.

Figure 6:
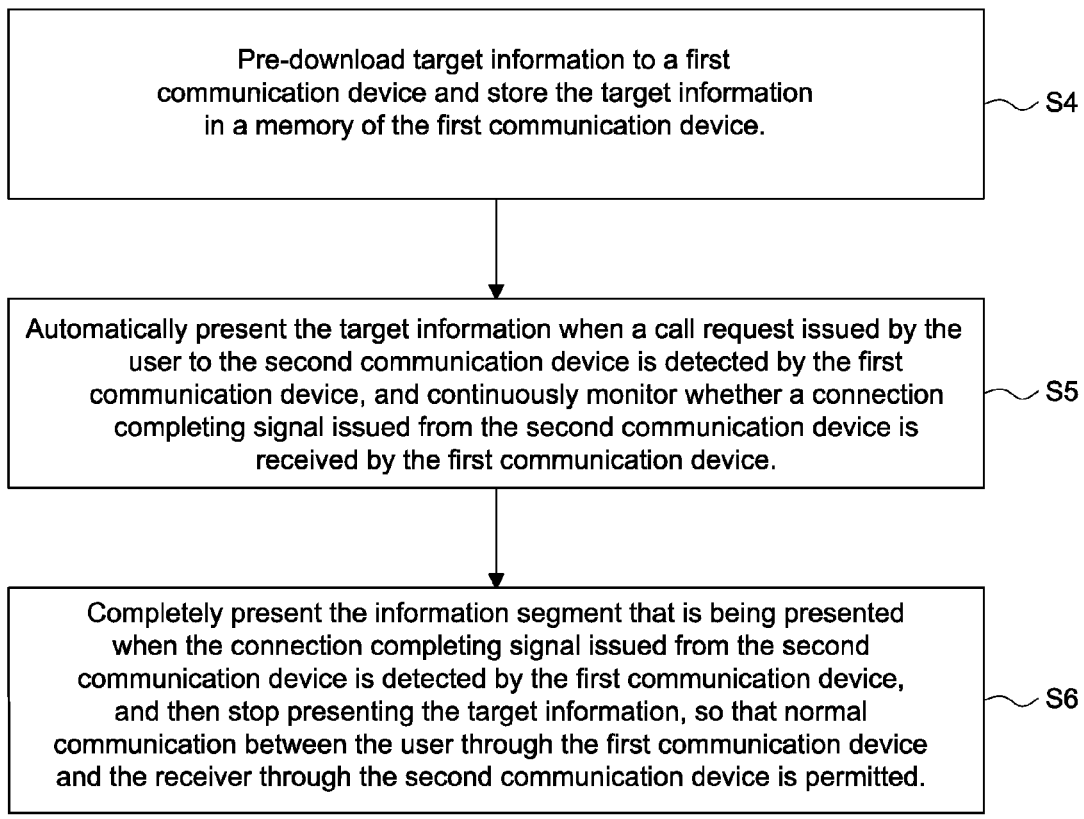
FIG. 6 is a flowchart illustrating an information presenting method according to a second embodiment of the present invention.

FIG. 6 is a flowchart illustrating an information presenting method according to a second embodiment of the present invention. Hereinafter, the information presenting method will be illustrated with reference to FIG. 6.

In the step S4, target information is pre-downloaded to a first communication device and stored in a memory of the first communication device.

The first communication device is in communication with a network system. The target information is pre-downloaded to the first communication device through the network system when the first communication device is in an idle time or a scheduled time. Moreover, the first communication device is in communication with the network system according to a telecommunication's wireless transmission technology (e.g. GPRS or CDMA), a computer's wireless transmission technology (e.g. WiFi, Wireless LAN, Bluetooth or RF), a computer's wired transmission technology (e.g. WLAN, RS-232 or WireFire), or any other wireless transmission technology.

In the step S5, when a call request issued from the user to a second communication device is detected by the first communication device, the target information is automatically presented by the first communication device, and the first communication device continuously detects whether a connection completing signal issued from the second communication device is received. If the call request issued from the user to the second communication device is detected by the first communication device, the main information segment is immediately and completely presented. After the main information segment has been completely presented, if no connection completing signal is issued from the second communication device, the plural minor information segments are successively presented.

In the step S6, when the connection completing signal issued from the second communication device is detected by the first communication device, the information segment that is being presented is completely presented, and then the presentation of the target information is stopped, so that normal communication between the user through the first communication device and the receiver through the second communication device is permitted. Meanwhile, the user of the first communication device can communicate with the user (i.e. a receiver) of the second communication device.

The step S4 of the second embodiment is distinguished from the step S1 of the first embodiment. In the Step S4, the target information is no longer divided into plural information segments, so that the user may watch or listen to the complete content of the target information.

Figure 7:
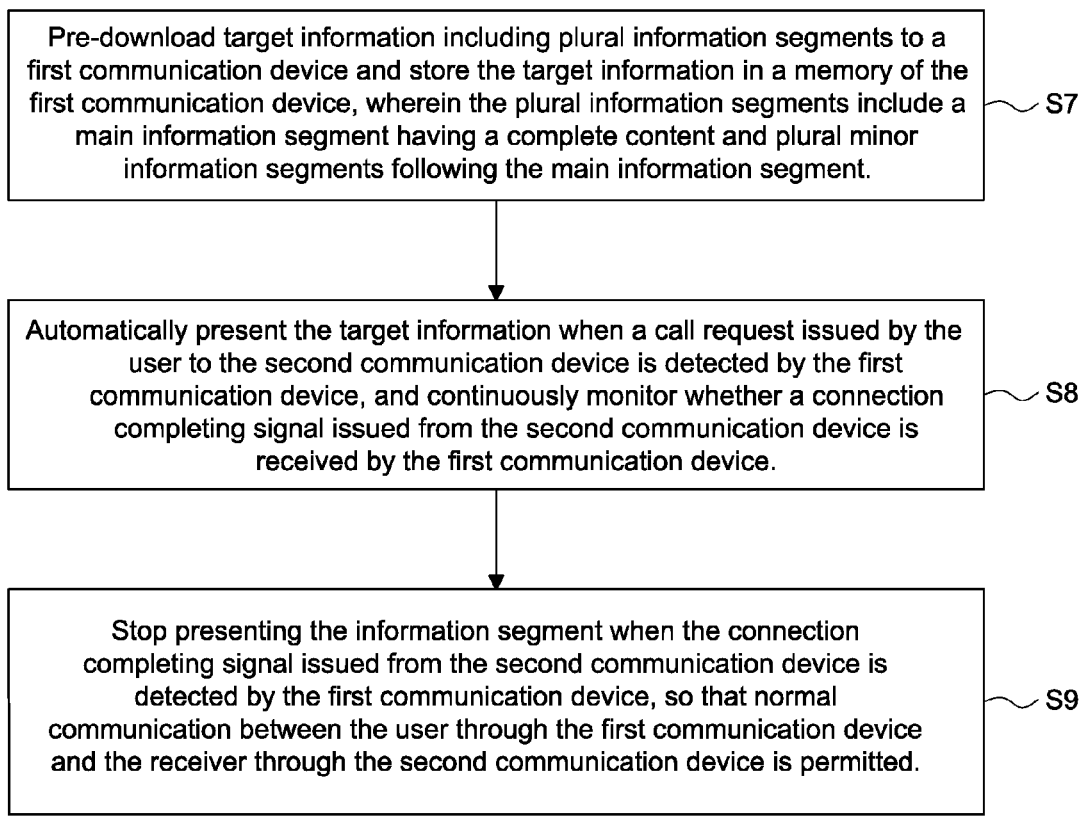
FIG. 7 is a flowchart illustrating an information presenting method according to a third embodiment of the present invention.

FIG. 7 is a flowchart illustrating an information presenting method according to a third embodiment of the present invention. Hereinafter, the information presenting method will be illustrated with reference to FIG. 7.

In the step S7, target information including plural information segments is pre-downloaded to a first communication device and stored in a memory of the first communication device, wherein the plural information segments include a main information segment having a complete content and plural minor information segments following the main information segment.

In the step S8, when a call request issued from the user to a second communication device is detected by the first communication device, the target information is automatically presented by the first communication device, and the first communication device continuously detects whether a connection completing signal issued from the second communication device is received.

In the step S9, when the connection completing signal issued from the second communication device is detected by the first communication device, the presentation of the information segment that is being presented is stopped, so that normal communication between the user through the first communication device and the receiver through the second communication device is permitted.

The step S9 of the third embodiment is distinguished from the step S3 of the first embodiment. In the step S9, when the connection completing signal issued from the second communication device is detected by the first communication device, the presentation of the information segment that is being presented is stopped. As such, the normal communication between the user through the first communication device and the receiver through the second communication device is quickly achieved.

From the above description, the information presenting method of the present invention can be applied to mobile phones in order to obviate the drawbacks encountered from the prior art. In addition, the information presenting method of the present invention can be applied to any other communication devices such as portable devices, fixed telephones or computers. As such, the industrial value is enhanced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An information presenting method for presenting target information by a first communication device during a call connection sequence, said first communication device having a memory, said call connection sequence being a time interval after a user issues a call request to a second communication device of a receiver through said first communication device and before a connection completing signal issued from said second communication device is received by the first communication device, said information presenting method comprising steps of:

(1) pre-downloading target information including plural information segments to said first communication device and storing said target information in said memory of said first communication device, wherein said plural information segments include a main information segment having a complete content and plural minor information segments following said main information segment;

(2) automatically presenting said target information when said call request issued by said user to said second communication device is detected by said first communication device, and continuously monitoring whether said connection completing signal issued from said second communication device is received by said first communication device; and (3) completely presenting said information segment that is being presented when said connection completing signal issued from the second communication device is detected by said first communication device, and then stopping presenting said target information, so that normal communication between said user through said first communication device and said receiver through said second communication device is permitted.

2. The information presenting method according to claim 1 wherein said call connection sequence contains a first time segment for waiting a mobile network to process a call request, a second time segment after an incoming call is generated in said second communication device and before said receiver accepts and answers said incoming call, and a third time segment after said receiver accepts and answers the incoming call to generate said connection completing signal and before said user responds to said connection completing signal.

3. The information presenting method according to claim 1 wherein said target information is presented during said call connection sequence by software, wherein said software is independent software, instant message software, browser software or a subroutine function module of any other information-providing application software.

4. The information presenting method according to claim 1 wherein said procedure of presenting said target information during said call connection sequence is implemented by a hardware-type function module of said first communication device.

5. The information presenting method according to claim 1 wherein in said step (2), when said call request issued by said user to said second communication device is detected by said first communication device, said main information segment is immediately and completely presented, wherein after said main information segment has been completely presented, if no connection completing signal is issued from said second communication device, said plural minor information segments are successively presented.

6. The information presenting method according to claim 5 wherein the duration of completely presenting said main information segment is longer than the duration of completely presenting each of said minor information segments.

7. The information presenting method according to claim 1 wherein said first communication device is further in communication with a network system, wherein in said step (1), said target information is downloaded to said first communication device through said network system when the first communication device is in an idle time or a scheduled time.

8. The information presenting method according to claim 7 wherein in said step (1), said target information is downloaded to said first communication device through said network system according to following sub-steps:
(11) accessing an information management platform system through said network system by inputting user identity information through a user accessing module of said first communication device;
(12) identifying said user identity information by a user information managing module of said information management platform system, wherein if said user identity information is valid, said first communication device is permitted to upload user-related information to said information management platform system so as to further transmit, analyze and process associated data;
(13) receiving said user-related information by a user behavior analyzing and managing module of said information management platform system, and analyzing said user-related information to determine whether a file-update operation needs to be performed on said first communication device or not, wherein if said file-update operation is performed on said first communication device, at least one data-filtering parameter is created;
(14) selecting and determining at least one specified file suitable for the user according to said at least one data-filtering parameter by an information file managing and downloading module of said information management platform system, and transmitting at least one file-selecting signal corresponding to said at least one specified file to an information database module of said information management platform system;
(15) sending said at least one specified file from said information database module back to said information file managing and downloading module of said information management platform system according to said file-selecting signal;
(16) transmitting said at least one specified file from said information file managing and downloading module to said first communication device; and
(17) receiving said at least one specified file by said first communication device, and performing a file managing and updating operation on said data stored in said memory by an information file managing and updating module.

9. The information presenting method according to claim 8 wherein in said sub-step (11), said user identity information includes a user account and a password associated with access of information-providing application software, or said user identity information includes a user account and a password specialized for downloading said target information.

10. The information presenting method according to claim 8 wherein in said sub-step (11), said first communication device is in communication with the network system according to a telecommunication's wireless transmission technology, a computer's wireless transmission technology or a computer's wired transmission technology.

11. The information presenting method according to claim 8 wherein said first communication device further comprises a call request detecting module, a connection completing signal detecting module and an intelligent information presenting module, wherein in said steps (2) and (3), said target information is presented by said first communication device according to following sub-steps:
(21) detecting said call request issued from said first communication device by said call request detecting module;
(22) transmitting a presentation-starting signal from said call request detecting module to said intelligent information presenting module;
(23) starting to present said main information segment of said target information by said intelligent information presenting module regardless of how said call request is processed by said network system, wherein during the main information segment is presented, said connection completing signal detecting module continuously detects a connection or disconnection status of said connection completing signal from the second communication device, thereby realizing whether said receiver responds to said call request;
(24) successively presenting said plural minor information segments of said target information if said second communication device has not communicated with said first communication device;
(25) a presentation-stopping signal is immediately issued from said connection completing signal detecting module to said intelligent information presenting module if said connection completing signal from the second communication device is detected; and
(26) completely presenting said main information segment or the minor information segment that is being presented and then stopping presenting said target information when said presentation-stopping signal is received by said intelligent information presenting module.

12. The information presenting method according to claim 8 wherein said first communication device further comprises a user behavior and device environmental information collecting module for collecting said user-related information.

13. The information presenting method according to claim 12 wherein said user-related information includes user behavior information and device environmental information, and said user behavior information is acquired from said information file managing and updating module by said user behavior and device environmental information collecting module.

14. The information presenting method according to claim 1 wherein said target information includes a video content, a sound content, an image content, an animation content, a text content, or the combination thereof.

15. The information presenting method according to claim 1 wherein said first communication device is a mobile communication device with the ability to connect to a network system and having a display screen, or a mobile phone, or a fixed telephone, or a computer.

16. An information presenting method for presenting target information by a first communication device during a call connection sequence, said first communication device having a memory, said call connection sequence being a time interval after a user issues a call request to a second communication device of a receiver through said first communication device and before a connection completing signal issued from said second communication device is received by the first communication device, said information presenting method comprising steps of:

(1) pre-downloading target information to said first communication device and storing said target information in said memory of said first communication device;

(2) automatically presenting said target information when said call request issued by said user to said second communication device is detected by said first communication device, and continuously monitoring whether said connection completing signal issued from said second communication device is received by said first communication device; and (3) completely presenting said information segment that is being presented when said connection completing signal issued from the second communication device is detected by said first communication device, and then stopping presenting said target information, so that normal communication between said user through said first communication device and said receiver through said second communication device is permitted.

17. The information presenting method according to claim 16 wherein said call connection sequence contains a first time segment for waiting a mobile network to process a call request, a second time segment after an incoming call is generated in said second communication device and before said receiver accepts and answers said incoming call, and a third time segment after said receiver accepts and answers the incoming call to generate said connection completing signal and before said user responds to said connection completing signal.

18. The information presenting method according to claim 16 wherein in said step (1), said pre-downloaded target information includes plural information segment, wherein said plural information segments include a main information segment having a complete content and plural minor information segments following said main information segment.

19. An information presenting method for presenting target information by a first communication device during a call connection sequence, said first communication device having a memory, said call connection sequence being a time interval after a user issues a call request to a second communication device of a receiver through said first communication device and before a connection completing signal issued from said second communication device is received by the first communication device, said information presenting method comprising steps of:

(1) pre-downloading target information including plural information segments to said first communication device and storing said target information in said memory of said first communication device, wherein said plural information segments include a main information segment having a complete content and plural minor information segments following said main information segment;

(2) automatically presenting said target information when said call request issued by said user to said second communication device is detected by said first communication device, and continuously monitoring whether said connection completing signal issued from said second communication device is received by said first communication device; and (3) stopping presenting said information segment when said connection completing signal issued from the second communication device is detected by said first communication device, so that normal communication between said user through said first communication device and said receiver through said second communication device is permitted.

20. The information presenting method according to claim 19 wherein in said step (3), when said connection completing signal issued from the second communication device is detected by said first communication device, said main information segment or said minor information segment that is being presented is completely presented, and then normal communication between said user through said first communication device and said receiver through said second communication device is permitted.

* * * * *